(No Model.)
D. BRION, Jr.
BELT REPLACER.
No. 551,486. Patented Dec. 17, 1895.
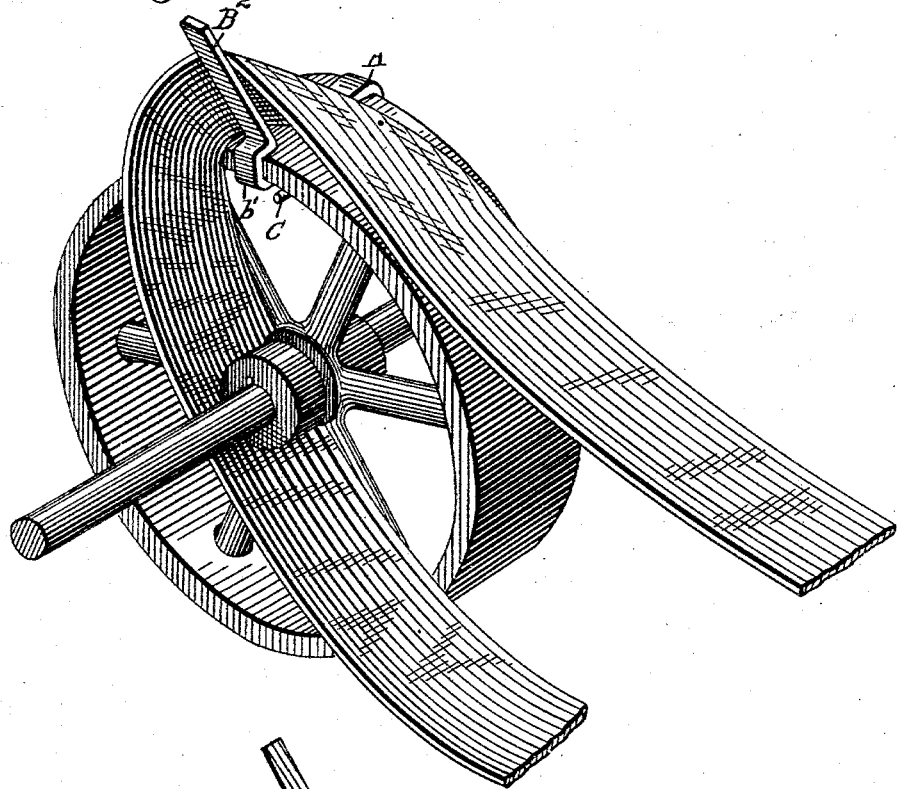
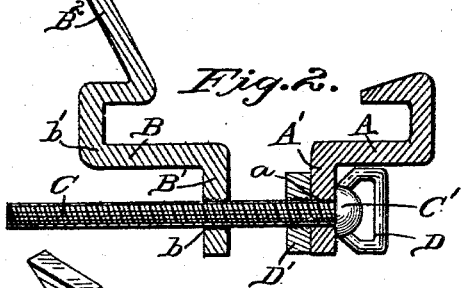
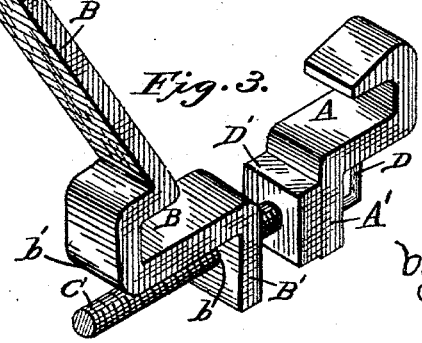
Witnesses
Edwin G. Miller
A. E. Hall
Inventor
Daniel Brion Jr.
by John Wedderburn
Attorney

UNITED STATES PATENT OFFICE.

DANIEL BRION, JR., OF BOZEMAN, MONTANA.

BELT-REPLACER.

SPECIFICATION forming part of Letters Patent No. 551,486, dated December 17, 1895.

Application filed August 28, 1895. Serial No. 560,753. (No model.)

*To all whom it may concern:*

Be it known that I, DANIEL BRION, Jr., a citizen of the United States, residing at Bozeman, in the county of Gallatin and State of Montana, have invented certain new and useful Improvements in Belt-Replacers; and I do hereby declare the following to be a full, clear, and exact description of the invention, such as will enable others skilled in the art to which it appertains to make and use the same.

This invention relates to certain new and useful improvements in belt-replacers adapted to throw a belt upon a pulley or wheel.

It has for its objects among others to provide a simple and cheap device that can be quickly applied and which will throw the belt upon the pulley or wheel without any attention on the part of the engineer or other person.

The device embodies a hook, a bolt and nut and a hook-shaped arm or guard detachably connected together and adapted for application to wheels or pulleys of different sizes.

Other objects and advantages of the invention will hereinafter appear and the novel features thereof will be specifically defined by the appended claim.

The invention in this instance resides in the peculiar combinations, and the construction, arrangement and adaptation of parts, all as more fully hereinafter described, shown in the drawings and then particularly pointed out in the claim.

The invention is clearly illustrated in the accompanying drawings, which, with the letters of reference marked thereon, form a part of this specification, and in which—

Figure 1 is a perspective view of my improvement applied to a wheel and showing the belt just about to be thrown on. Fig. 2 is a vertical section of my improved belt-replacer, and Fig. 3 is a perspective view of the same.

Like letters of reference indicate like parts throughout the several views.

Referring now to the details of the drawings by letter, A designates one part of the belt-replacer which is in the form of a hook with a portion A' at right angles thereto and provided with an opening $a$ for the passage of the bolt soon to be described. This may be formed of any suitable material and any required size. B is the other part of the belt-replacer. It is formed with a portion B' at right angles thereto and provided with an opening $b$ for the passage of the bolt, the said part B being bent as shown at $b'$ to form a hook and thence extended to form the guard-arm $B^2$, the upper face of which is perfectly curved, the said guard being on an incline with reference to the body portion of the said part.

C is the bolt. It is screw-threaded for the greater portion of its length and is provided with a head C' and with some suitable means, as the ring D, held in said head, by which it may be turned when desired.

D' is a nut. It is placed upon the bolt between the two right-angled portions of the parts A and B as shown.

In practice the device is applied to the wheel as shown and the belt hung over the guard-arm. When the machinery is started the belt will ride down the incline of the guard-arm and be thrown onto the wheel or pulley, as will be readily understood.

Modifications in detail may be resorted to without departing from the spirit of the invention or sacrificing any of its advantages. By simply lengthening the bolt the device may be adapted for use in connection with wheels or pulleys of larger diameters.

What is claimed as new is—

The belt-replacer described consisting of the portion A in the form of a hook with a part at right angles thereto and provided with an opening, a separate part B with right angled portion with opening and bent to form an oppositely-disposed hook and an integral inclined guard arm extending from the upper portion of the hook, a bolt passed through said openings, and a nut on said bolt between the two right-angled portions, as and for the purpose set forth.

In testimony whereof I have signed this specification in the presence of two subscribing witnesses.

DANIEL BRION, JR.

Witnesses:
ELMER WILLIAMS,
GEORGE BRION.